United States Patent
Ramsden

(10) Patent No.: US 7,257,727 B2
(45) Date of Patent: Aug. 14, 2007

(54) TIMER SYSTEMS AND METHODS

(75) Inventor: Edward A. Ramsden, Hillsboro, OR (US)

(73) Assignee: Lattice Semiconductor Corporation, Hillsboro, OR (US)

( * ) Notice: Subject to any disclaimer, the term of this patent is extended or adjusted under 35 U.S.C. 154(b) by 513 days.

(21) Appl. No.: 10/794,079

(22) Filed: Mar. 4, 2004

(65) Prior Publication Data

US 2005/0198550 A1    Sep. 8, 2005

(51) Int. Cl.
*H03B 19/00*        (2006.01)

(52) U.S. Cl. ............... 713/501; 713/400; 713/401; 713/500; 713/502; 713/503; 713/600; 713/601

(58) Field of Classification Search ............ None
See application file for complete search history.

(56) References Cited

U.S. PATENT DOCUMENTS

| 4,654,851 | A | * | 3/1987 | Busby | 714/741 |
| 5,049,766 | A | * | 9/1991 | van Driest et al. | 327/269 |
| 6,185,709 | B1 | * | 2/2001 | Dreibelbis et al. | 714/726 |
| 6,956,793 | B2 | * | 10/2005 | Ngo | 368/156 |

OTHER PUBLICATIONS

Lattice Semiconductor Corporation, ispPAC-POWR604 Data Sheet, pp. 1-29, © 2004.
Lattice Semiconductor Corporation, ispPAC-POWR1208 Data Sheet, pp. 1-33, © 2003.

* cited by examiner

*Primary Examiner*—A. Elamin
(74) *Attorney, Agent, or Firm*—MacPherson Kwok Chen & Heid LLP; Greg J. Michelson

(57) ABSTRACT

Systems and methods are disclosed for timer architectures. For example, in accordance with an embodiment of the present invention, a timer system includes a prescaler and one or more timer cells each having a multiplexer and a counter.

20 Claims, 3 Drawing Sheets

TIMER SYSTEMS AND METHODS

TECHNICAL FIELD

The present invention relates generally to electrical circuits and, more particularly, to timers.

BACKGROUND

Timers are well known and employed in a variety of electrical devices, such as for example to provide desired delays (e.g., user-defined delays) and other time-related functions. One drawback of some conventional timers is their limited resolution. For example, a conventional timer may only provide a power-of-2 resolution with respect to the available time intervals.

Another drawback is that a number of conventional timers within an electrical device may share certain common circuitry in such a way that the time intervals provided by the different timers are limited significantly (e.g., available time intervals differ within a limited range of 128:1). Furthermore, a conventional timer operating at a lower portion of its intended range may provide a large timing uncertainty (e.g., fifty percent) between a clock used to drive the timer and an event used to trigger the timer.

One or more of the drawbacks noted above may be attributable to design compromises resulting from a limited number of signals available for configuring a timer (e.g., only fifteen bits permitted to configure four timers within a programmable logic device). Conventional timer architectures that attempt to address these drawbacks may require a large number of additional signals to configure the timer and a great deal of additional circuitry, resulting in significant costs in terms of space and complexity. As a result, there is a need for improved timer architectures.

SUMMARY

Systems and methods are disclosed herein to provide timers for electrical devices. For example, in accordance with an embodiment of the present invention, a timer architecture is disclosed having a prescaler for one or more timer cells, with each timer cell having a multiplexer and a preloadable counter. The counter may have one of its preloaded bits (e.g., the most significant bit) always set to a predetermined value (e.g., a one). The timer architecture may require less circuitry but provide certain advantages over conventional timer systems, such as with respect to timing uncertainty, timer resolution, and/or relative dynamic range between timers within the timer architecture.

More specifically, in accordance with one embodiment of the present invention, a timer includes a prescaler adapted to receive an input clock signal and provide a plurality of different output clock signals; and a timer cell having a first multiplexer adapted to select from the output clock signals from the prescaler and the input clock signal to provide a counter clock signal; and a counter adapted to receive the counter clock signal, a reset signal, and a preloadable control signal and provide a timer output signal.

In accordance with another embodiment of the present invention, a programmable logic device includes a prescaler adapted to receive an input clock signal and provide a number of output clock signals; a first multiplexer adapted to select from at least the output clock signals from the prescaler based on a first control signal and provide a counter clock signal; and a counter adapted to receive the counter clock signal and a preloadable control signal and provide a timer output signal.

In accordance with another embodiment of the present invention, a method of providing a timer signal includes receiving an input clock signal; generating a number of different clock signals based on the input clock signal; selecting one clock signal from among the different clock signals to provide as a counter clock signal; and providing a counter adapted to receive the counter clock signal and a control signal, which controls a timer period for the counter, and provide a timer output signal.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

Figure 1:
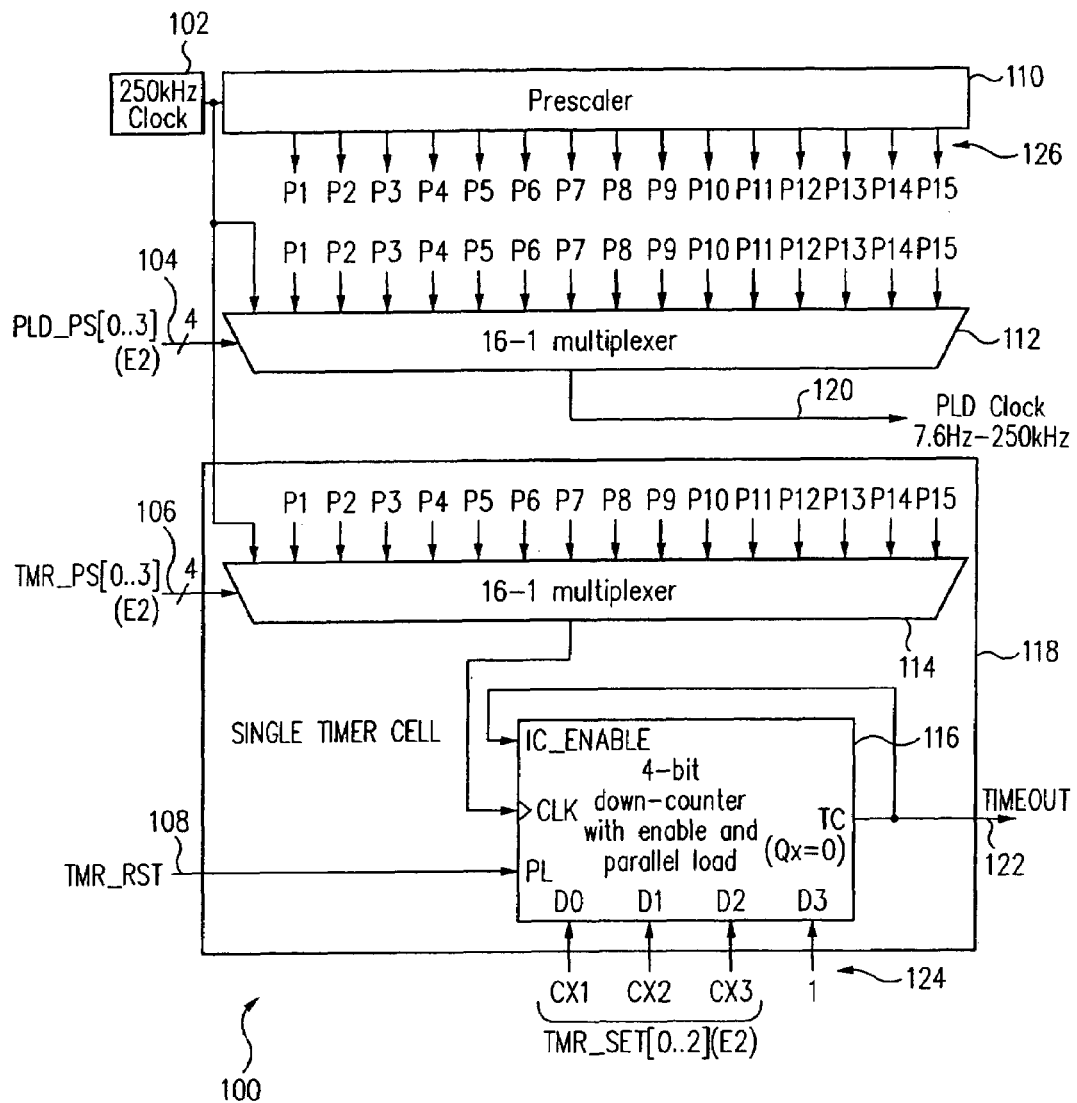
FIG. 1 shows a block diagram illustrating a timer architecture in accordance with an embodiment of the present invention.

FIG. 1 shows a block diagram illustrating a timer architecture 100 in accordance with an embodiment of the present invention. Timer architecture 100 includes a prescaler 110, multiplexers 112 and 114, and a counter 116.

Prescaler 110 and multiplexers 112 and 114 receive an input clock signal 102 (e.g., a 250 kHz clock signal). Prescaler 110 (e.g., a 15 bit prescaler) provides a number of divided-down clock signals 126 (e.g., P1 through P15) to multiplexers 112 and 114.

Multiplexer 112 (e.g., a 16:1 multiplexer) also receives control signals 104 (labeled PLD_PS[0 to 3]), which determine the selection of input clock signal 102 or one of clock signals 126 to provide as an output clock signal 120. Clock signal 120, for the exemplary implementation shown in FIG. 1, may have a range of 7.6 Hz (≈131 msec) to 250 kHz (≈4 μsec) and be employed as the internal clock of an integrated circuit (e.g., a programmable logic device or other type of integrated circuit) that incorporates timer architecture 100.

Multiplexer 114 and counter 116 form a timer cell 118. Multiplexer 114 (e.g., a 16:1 multiplexer) receives control signals 106 (labeled TMR_PS[0 to 3]), which determine the selection of input clock signal 102 or one of clock signals 126 to provide as a clock signal at a clock input terminal (labeled CLK) of counter 116.

Counter 116 also receives a reset signal 108 (labeled TMR_RST) at a parallel load (PL) terminal and control signals 124, which in this exemplary implementation provide four bits to input terminals D0, D1, D2, and D3. Counter 116 provides a timer output signal 122 (labeled TIMEOUT) at an output terminal (labeled TC for terminal count), with timer output signal 122 also fed back to a counter enable terminal (labeled !C$_{13}$ ENABLE).

In this exemplary implementation, counter 116 may represent a preloadable four-bit down counter (with an enable and a parallel load terminal), which stops counting when it reaches zero (i.e., "0000"). For example, when reset signal 108 is asserted (e.g., a logical high value), the values of control signal 124 are loaded into counter 116 and timer output signal 122 is asserted (e.g., transitions to a high logic level), which is fed to the counter enable terminal which then allows counter 116 to count down to zero. When timer output signal 122 reaches the zero value, the low logical value fed back to the counter enable terminal stops counter 116 from counting. The process is repeated when reset signal 108 is asserted again.

The most significant bit of control signal 124 (provided to the input terminal D3) may be set to a predetermined "1" value (as shown in FIG. 1), for example, by software or a hardwired connection. The other (lower) three bits (labeled CX1, CX2, and CX3 or TMR_SET[0 to 2]) of control signal 124 may each be a one or a zero value and are provided to the input terminals D0, D1, and D2. Alternatively for example, counter 116 may be implemented as an up-counter, with the most significant bit of control signal 124 set to a predetermined "0" (zero) value, or counter 116 may be implemented as a saturating counter or other type of counter as known in the art.

Thus, in this embodiment, only periods ranging from eight to fifteen prescaler units are allowed, which correspond to user-selected preload values ranging from zero to seven. Also, because the timing uncertainty (i.e., the time between preload command via control signal 108 and assertion of timer output signal 122) is ±1 prescaler unit of prescaler 110, the maximum time uncertainty may be less than thirteen percent.

Table 1 provides exemplary timer values based on the exemplary implementation example illustrated in FIG. 1. As shown in Table 1, for prescale values ranging from 0 to 15 and preload values ranging from 0 to 7 (for bits CX1 through CX3), the resolution (given a 250 kHz input clock signal 102) may vary from 0.004 msec to 131.1 msec and the timeout period may vary from 32 μsec to almost 2 seconds. By setting the most significant bit, the dynamic range for each prescale value is limited to approximately 2:1 as illustrated by the exemplary values in Table 1. For example, the dynamic range for the prescale value 1 extends from 0.064 msec to 0.120 msec.

TABLE 1

| Pre-scale | Resolution (msec) | Preload Value & Timeout period (msec) | | | | | | | |
|---|---|---|---|---|---|---|---|---|---|
| | | 0 | 1 | 2 | 3 | 4 | 5 | 6 | 7 |
| 0 | 0.004 | 0.032 | 0.036 | 0.040 | 0.044 | 0.048 | 0.052 | 0.056 | 0.060 |
| 1 | 0.008 | 0.064 | 0.072 | 0.080 | 0.088 | 0.096 | 0.104 | 0.112 | 0.120 |
| 2 | 0.016 | 0.128 | 0.144 | 0.160 | 0.176 | 0.192 | 0.208 | 0.224 | 0.240 |
| 3 | 0.032 | 0.256 | 0.288 | 0.320 | 0.352 | 0.384 | 0.416 | 0.448 | 0.480 |
| 4 | 0.064 | 0.512 | 0.576 | 0.640 | 0.704 | 0.768 | 0.832 | 0.896 | 0.960 |
| 5 | 0.128 | 1.024 | 1.152 | 1.280 | 1.408 | 1.536 | 1.664 | 1.792 | 1.920 |
| 6 | 0.256 | 2.048 | 2.304 | 2.560 | 2.816 | 3.072 | 3.328 | 3.584 | 3.840 |
| 7 | 0.512 | 4.096 | 4.608 | 5.120 | 5.632 | 6.144 | 6.656 | 7.168 | 7.680 |
| 8 | 1.024 | 8.192 | 9.216 | 10.24 | 11.26 | 12.29 | 13.31 | 14.34 | 15.36 |
| 9 | 2.048 | 16.38 | 18.43 | 20.48 | 22.53 | 24.58 | 26.62 | 28.67 | 30.72 |
| 10 | 4.096 | 32.77 | 36.86 | 40.96 | 45.06 | 49.15 | 53.25 | 57.34 | 61.44 |
| 11 | 8.192 | 65.54 | 73.73 | 81.92 | 90.11 | 98.30 | 106.5 | 114.7 | 122.9 |
| 12 | 16.38 | 131.1 | 147.5 | 163.4 | 180.2 | 196.6 | 213.0 | 229.4 | 245.8 |
| 13 | 32.77 | 262.1 | 294.9 | 327.7 | 360.4 | 939.2 | 426.0 | 458.8 | 491.5 |
| 14 | 65.54 | 524.3 | 589.8 | 655.4 | 720.9 | 786.4 | 852.0 | 917.5 | 983.0 |
| 15 | 131.1 | 1048 | 1180 | 1311 | 1442 | 1572 | 1704 | 1835 | 1966 |

Control signals 104, 106, and one or more of control signals 124, for example, may be provided by external (e.g., user-provided signals) or internal signals (e.g., from a microprocessor or other type of logic circuit) of the integrated circuit or other electrical device incorporating timer architecture 100. For example, control signals 104, 106, and control signal 124 as indicated in FIG. 1 may be provided by configuration memory cells (e.g., electrically erasable complementary metal oxide semiconductor (EECMOS or E2 as labeled in FIG. 1) memory cells) of a programmable logic device incorporating timer architecture 100.

It should be understood that multiplexer 112 (along with control signals 104) and output clock signal 120 are optional components of timer architecture 100 and may be eliminated if clock signal 120 is not desired or required for a particular design or application. It should also be understood that timer architecture 100 may have more than one timer cell 118.

Figure 2A:
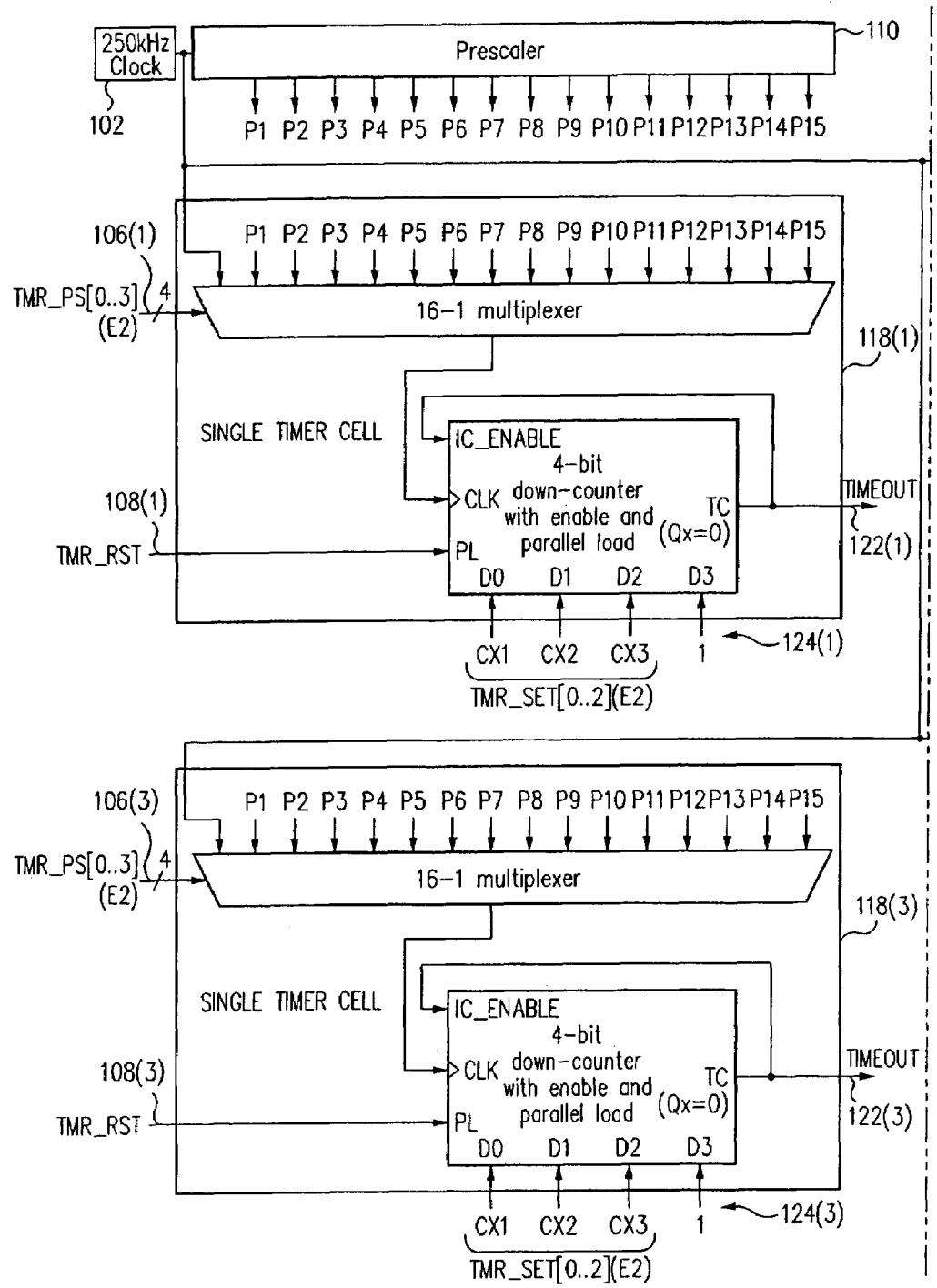
FIG. 2 shows a block diagram illustrating a timer architecture in accordance with an embodiment of the present invention.
Figure 2B:
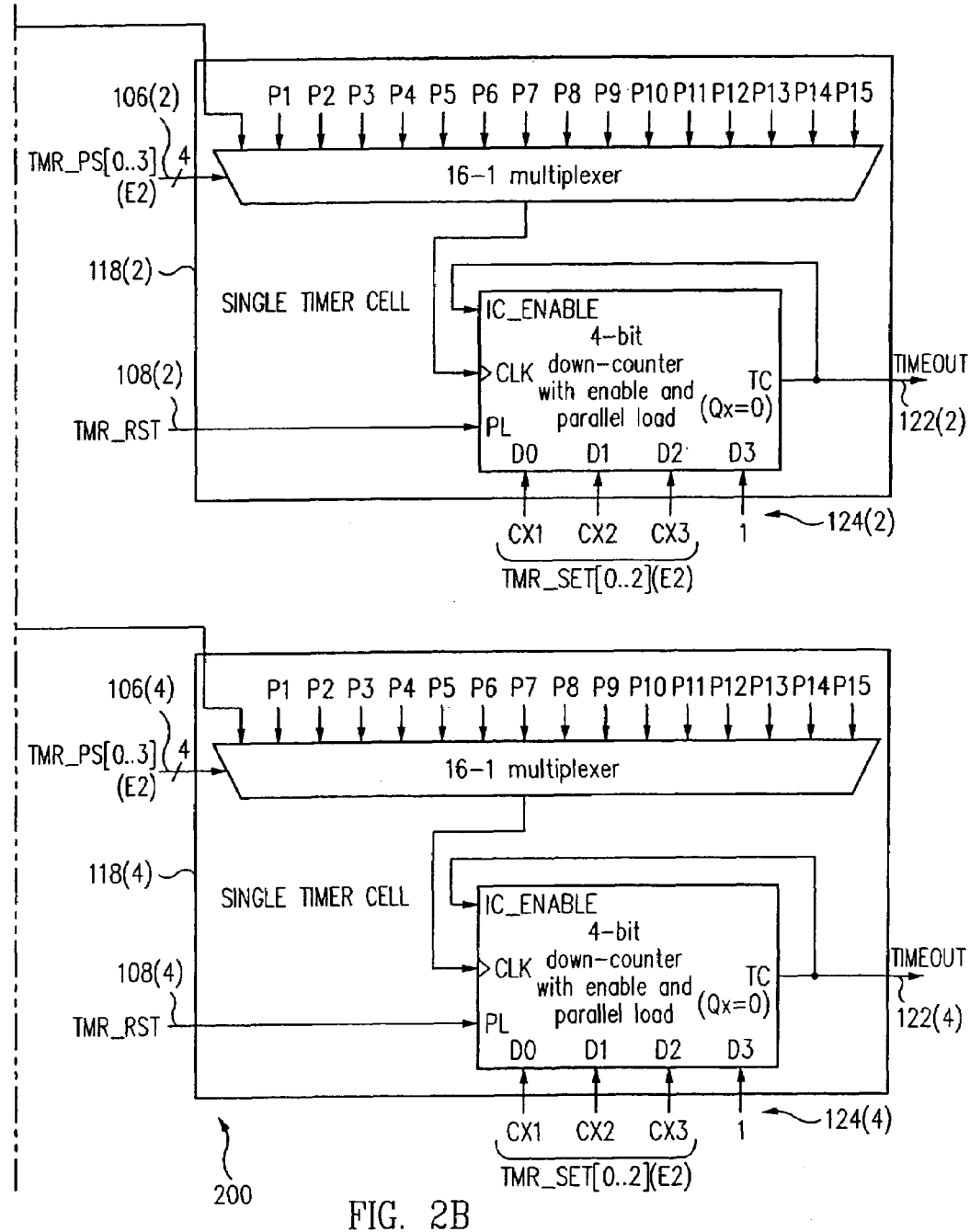

For example, FIG. 2 shows a block diagram illustrating a timer architecture 200 in accordance with an embodiment of the present invention. Timer architecture 200 is similar to timer architecture 100 (and therefore general features and operations will not be repeated), but is extended to include additional timer cells 118. Also, timer architecture 200 in this exemplary implementation does not provide output clock signal 120 and therefore does not include optional multiplexer 112.

Specifically, timer architecture 200 includes prescaler 110 along with four timer cells 118 (identified as timer cell 118(1) through timer cell 118(4)). Timer cells 118(1) through 118(4) have corresponding control signals 106(1) through 106(4), control signals 124(1) through 124(4), corresponding reset signals 108(1) through 108(4), and provide corresponding timer output signals 122(1) through 122(4). Although four timer cells are shown in the exemplary implementation shown in FIG. 2, it should be understood that any number of timer cells 118 may be provided within a timer architecture by utilizing the techniques disclosed herein in accordance with one or more embodiments of the present invention.

As an implementation example, timer architecture 200 may provide a wide-range timer system having a dynamic range greater than 60,000:1 and a spacing between adjacent available time steps and a worst-case uncertainty of approximately twelve percent. If configuration memory cells are utilized to provide control signal 106 (e.g., 4 bits) and three bits of control signal 124, then each timer cell 118 would require 7 memory cells or a total of 28 bits of configuration memory (i.e., 28 signals) to implement four timer cells (timer cells 118(1) through 118(4)). Timer cells 118(1) through 118(4), for example, may provide timeouts (e.g., time delays) ranging approximately from 32 μsecs to 2 seconds, with time steps spaced a maximum of approximately twelve percent apart.

Timer architecture 200, besides requiring relatively few configuration or control signals, may also require relatively few circuit elements. For example, timer architecture 200 having prescaler 110 and timer cells 118(1) through 118(4) may be implemented with approximately 31 flip flops and four multiplexers (in addition to the 28 configuration memory cells). If an output clock signals is desired, an additional multiplexer and four additional configuration memory cells may be added to timer architecture 200 to provide output clock signal 120 as disclosed in FIG. 1 in accordance with an embodiment of the present invention.

In accordance with an embodiment of the present invention, a timer architecture is disclosed having a prescaler and one or more timer cells within the timer architecture, with each timer cell having a multiplexer and a counter. The counter may be a short, preloadable up-counter or down-counter with one of the bits of control signal 124 set to a predetermined value (e.g., one). The timer architecture, relative to conventional timer architectures, may provide a greater resolution in setting time or time intervals, a reduction in timing uncertainty (e.g., when operating in the lower portion of the timer range), a larger dynamic range between individual timers, and/or a reduction in circuitry required to implement the timer functions (e.g., fewer flip flops and/or fewer memory cells utilized to configure the timers).

Embodiments described above illustrate but do not limit the invention. It should also be understood that numerous modifications and variations are possible in accordance with the principles of the present invention. Accordingly, the scope of the invention is defined only by the following claims.

I claim:

1. A timer comprising:
    a prescaler adapted to receive an input clock signal and provide a plurality of different output clock signals; and
    a timer cell comprising:
        a first multiplexer adapted to select from the output clock signals from the prescaler and the input clock signal to provide a counter clock signal; and
        a counter adapted to receive the counter clock signal, a reset signal, and a preloadable control signal and provide a timer output signal; and
    wherein the counter is a preloadable counter with an enable terminal and a parallel load terminal, and wherein the timer output signal is fed back to the enable terminal, with the parallel load terminal receiving the reset signal.

2. The timer of claim 1, wherein one or more bits of the preloadable control signal are set to a predetermined value.

3. The timer of claim 1, wherein one or more bits of the preloadable control signal are set by a hardwired connection to a predetermined value.

4. The timer of claim 1, wherein a most significant bit of the preloadable control signal is set to a predetermined value.

5. The timer of claim 1, wherein the timer further comprises a number of the timer cells.

6. The timer of claim 1, further comprising a second multiplexer adapted to select from the output clock signals from the prescaler and the input clock signal to provide a first output clock signal.

7. The timer of claim 6, further comprising configuration memory cells adapted to provide a second control signal for the second multiplexer to control the selection made by the second multiplexer.

8. The timer of claim 1, wherein the timer is implemented within a programmable logic device.

9. The timer of claim 1, further comprising configuration memory cells adapted to provide one or more bits of the preloadable control signal and a first control signal for the first multiplexer to control the selection made by the first multiplexer.

10. The timer of claim 1, wherein the counter is a down-counter.

11. A programmable logic device comprising:
    a prescaler adapted to receive an input clock signal and provide a number of output clock signals;
    a first multiplexer adapted to select from at least the output clock signals from the prescaler based on a first control signal and provide a counter clock signal; and
    a counter adapted to receive the counter clock signal and a preloadable control signal and provide a timer output signal, wherein the timer output signal is fed back as an enable signal for the counter.

12. The programmable logic device of claim 11, wherein one or more bits of the preloadable control signal are set to a predetermined value.

13. The programmable logic device of claim 11, further comprising configuration memory cells adapted to provide the first control signal and one or more bits of the preloadable control signal.

14. The programmable logic device of claim 11, wherein the first multiplexer and the counter form a timer cell, with the programmable logic device further comprising a number of the timer cells.

15. The programmable logic device of claim 14, further comprising a second multiplexer adapted to select from at least the output clock signals from the prescaler based on a second control signal and provide a second output clock signal.

16. The programmable logic device of claim 15, further comprising configuration memory cells adapted to provide the second control signal.

17. A method of providing a timer signal, the method comprising:
    receiving an input clock signal;
    generating a number of different clock signals based on the input clock signal;
    selecting one clock signal from among the different clock signals to provide as a counter clock signal;
    providing a counter adapted to receive the counter clock signal and a control signal, which controls a timer period for the counter, and to provide a timer output signal; and providing the timer output signal to an enable terminal of the counter, wherein the counter is further adapted to receive a reset signal, which controls the loading of bits into the counter from the control signal.

18. The method of claim 17, wherein at least one bit of the control signal is always set to a predetermined value.

19. The method of claim 17, further comprising selecting one clock signal from among the different clock signals to provide as a first output clock signal.

20. The method of claim 17, further comprising providing one or more bits of the control signal via configuration memory cells.

* * * * *